US009732867B2

(12) United States Patent
Fawcett

(10) Patent No.: US 9,732,867 B2
(45) Date of Patent: Aug. 15, 2017

(54) RELIEF VALVE

(71) Applicant: Lyman Fawcett, St. Petersburg, FL (US)

(72) Inventor: Lyman Fawcett, St. Petersburg, FL (US)

(73) Assignee: Halkey-Roberts Corporation, St. Petersburg, FL (US)

( * ) Notice: Subject to any disclaimer, the term of this patent is extended or adjusted under 35 U.S.C. 154(b) by 5 days.

(21) Appl. No.: 14/256,656

(22) Filed: Apr. 18, 2014

(65) Prior Publication Data

US 2014/0311593 A1 Oct. 23, 2014

Related U.S. Application Data

(60) Provisional application No. 61/813,599, filed on Apr. 18, 2013.

(51) Int. Cl.
*F16K 17/04* (2006.01)
*F16K 15/02* (2006.01)
(Continued)

(52) U.S. Cl.
CPC ........ *F16K 17/0433* (2013.01); *F16K 15/028* (2013.01); *F16K 27/0209* (2013.01); *F16K 47/08* (2013.01); *Y10T 137/7739* (2015.04)

(58) Field of Classification Search
CPC ............. F16K 17/0433; F16K 27/0209; F16K 15/028; F16K 47/08; Y10T 137/7739; Y10T 137/7925; Y10T 137/7939
See application file for complete search history.

(56) References Cited

U.S. PATENT DOCUMENTS 432,140 A * 7/1890 Kilborn ............... F16K 17/0433
137/469
1,150,743 A * 8/1915 Butts ........................ F16K 1/46
137/516.29

(Continued)

FOREIGN PATENT DOCUMENTS

CH WO 201301714 A1 * 2/2013 ........... F16K 15/025
KR WO 2010018944 A2 * 2/2010 .......... F04B 27/1009

*Primary Examiner* — Craig Schneider
*Assistant Examiner* — Frederick D Soski
(74) *Attorney, Agent, or Firm* — GrayRobinson, P.A.

(57) ABSTRACT

A relief valve having a crenelated exhaust ring surrounding the poppet. The crenelated exhaust ring comprises a series of alternating crenels and merlons which together define an increasing cross-sectional exhaust area circumferentially about the poppet during cracking (i.e., once the pressure in the inflatable device exceeds the cracking pressure) as the poppet rises in the relief valve in response to increased pressures and, conversely, a decreasing cross-sectional exhaust area about the poppet during closing as the poppet lowers to its re-seated, sealed position. The design of the crenels in the form of a larger upper cross-sectional area to a smaller lower cross-sectional opening, advantageously achieves a reseating pressure that is substantially equal to or slightly less than the cracking pressure while minimizing possible oscillations during re-seating of the poppet. The crenelated exhaust ring surrounding the poppet advantageously results in a relief valve having a higher flow rate at a given back pressure than would be achieved without the crenelated exhaust ring surrounding the poppet.

13 Claims, 13 Drawing Sheets

(51) Int. Cl.
 *F16K 27/02* (2006.01)
 *F16K 47/08* (2006.01)

(56) References Cited

U.S. PATENT DOCUMENTS

| | | | | |
|---|---|---|---|---|
| 2,449,683 | A * | 9/1948 | Akerman | F16K 15/028 137/543.21 |
| 4,406,302 | A * | 9/1983 | Olesen | F16K 17/0433 137/469 |
| 5,186,198 | A * | 2/1993 | Kennedy | F02F 7/006 137/14 |
| 7,096,884 | B2 * | 8/2006 | Mackal | F16K 15/028 137/540 |
| 7,469,713 | B2 | 12/2008 | Mackal | |
| 2007/0095403 | A1 * | 5/2007 | Su | B65D 31/14 137/512.15 |
| 2008/0185055 | A1 * | 8/2008 | Niedermair | F16K 15/028 137/540 |
| 2012/0080101 | A1 | 4/2012 | Tatarek | |
| 2014/0166138 | A1 * | 6/2014 | Bisig | F16K 15/025 137/625 |

\* cited by examiner

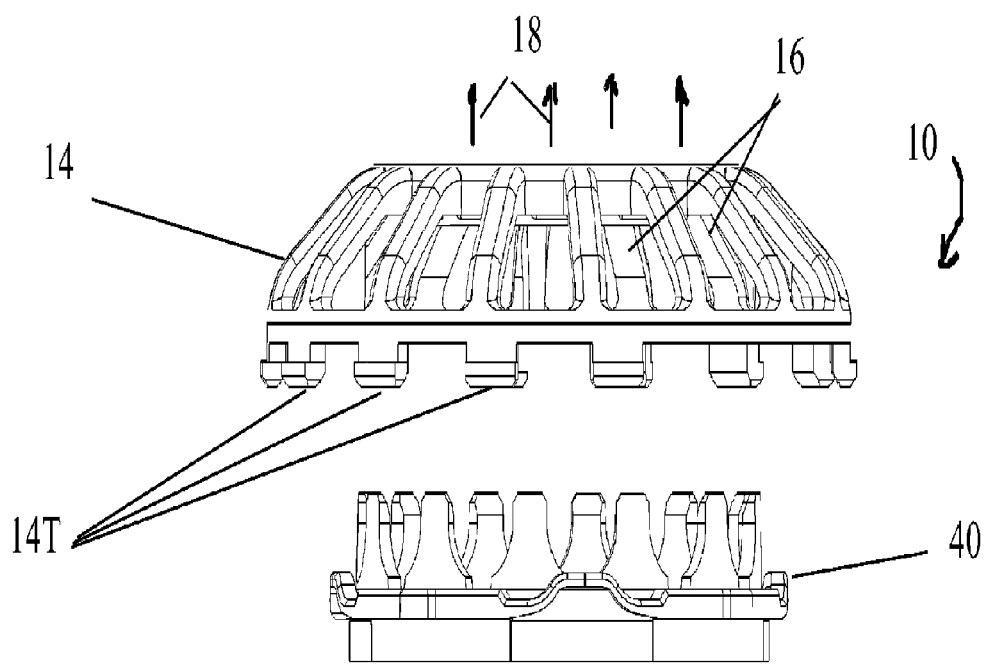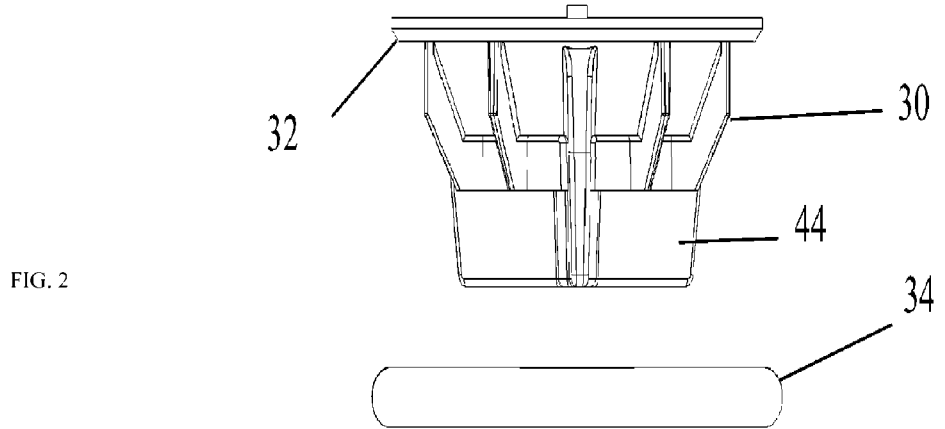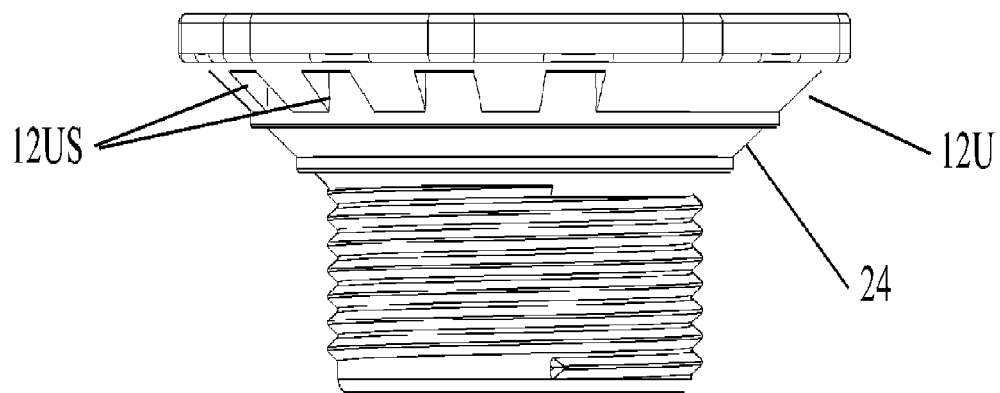
FIG. 2

RELIEF VALVE

CROSS-REFERENCE TO RELATED INVENTIONS

This application claims the benefit of provisional patent application, Ser. No. 61/813,599, filed Apr. 18, 2013, the disclosure of which is hereby incorporated by reference herein.

BACKGROUND OF THE INVENTION

This invention relates to relief valves. More particularly, this invention relates to relief valves having similar cracking and reseat pressures.

DESCRIPTION OF THE BACKGROUND ART

Presently, there exist many types of check valves designed to allow the flow of a fluid such as a gas in one direction but to block or "check" the flow of the fluid in the opposite direction. The amount of fluid force required to open the poppet of the valve in the un-checked direction is often referred to as the cracking pressure. Typically, the cracking pressure of a check valve is determined by the spring force and spring constant of the internal spring that constantly urges the poppet into a sealing position until unseated therefrom once the cracking pressure is attained and the valve is opened allowing fluid flow therethrough. Conversely, the poppet is reseated into its sealing, closed position by the force of the spring once the pressure is reduced to a predetermined resealing pressure. In applications such as when check valves are used as relief valves for inflatable devices (e.g., inflatable life rafts, inflatable hospitals, inflatable slides for airplane evacuations), it is desirous for the cracking pressure to be appreciably less than the bursting pressure of the inflatable device to prevent inadvertent over-inflation and bursting of the inflatable device. It is also desirous for the reseating pressure to be appreciably greater than the minimal inflation pressure that is needed to achieve the desired rigidity of the inflatable device. Consequently, in many applications it is desirable for the cracking pressure to be approximately equal to or slightly less than the reseating pressure to assure the relief valve will function to properly inflate the inflatable device to a pressure above the minimal inflation pressure without reaching the bursting pressure and to then reseat at a reseating pressure that is still above the minimal inflation pressure. Unfortunately, however, the reseat pressure of many prior art relief valves is substantially lower than the cracking pressure.

Moreover, some relief valves suffer from excessive oscillations during opening or closing, which in extreme situations could self-dissemble or otherwise come part.

Therefore, it is an object of this invention to provide an improvement that overcomes the aforementioned inadequacies of the prior art devices and provides an improvement that is a significant contribution to the advancement of the relief valve art.

Another object of this invention is to provide a relief valve having a reseat pressure that is equal to or slightly less than its cracking pressure.

Another object of this invention is to provide a relief valve that minimizes oscillations during opening or closing.

Another object of this invention is to provide a relief valve having an increased flow rate.

Another object of this invention is to provide a relief valve having a structure composed of a minimal number of parts to increase its reliability while decreasing cost of manufacture and assembly.

The foregoing has outlined some of the pertinent objects of the invention. These objects should be construed to be merely illustrative of some of the more prominent features and applications of the intended invention. Applying the disclosed invention in a different manner or modifying the invention within the scope of the disclosure may attain many other beneficial results. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a relief valve having a crenelated exhaust ring surrounding the poppet. The crenelated exhaust ring comprises a series of alternating crenels and merlons which together define an increasing cross-sectional exhaust area circumferentially about the poppet during cracking (i.e., once the pressure in the inflatable device exceeds the cracking pressure) as the poppet rises in the relief valve in response to increased pressures and, conversely, a decreasing cross-sectional exhaust area about the poppet during closing as the poppet lowers to its re-seated, sealed position. Moreover, the particular design of the crenels in the form of a larger upper cross-sectional area to a smaller lower cross-sectional opening, advantageously achieves a reseating pressure that is substantially equal to or slightly less than the cracking pressure while minimizing possible oscillations during re-seating of the poppet. Finally, the crenelated exhaust ring surrounding the poppet advantageously results in a relief valve having a higher flow rate at a given back pressure than would be achieved without the crenelated exhaust ring surrounding the poppet.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is a an exploded front view of the relief valve of the invention (with spring omitted);

Similar reference characters refer to similar parts throughout the several views of the drawings.

DETAILED DESCRIPTION OF THE PREFERRED EMBODIMENT

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 12:
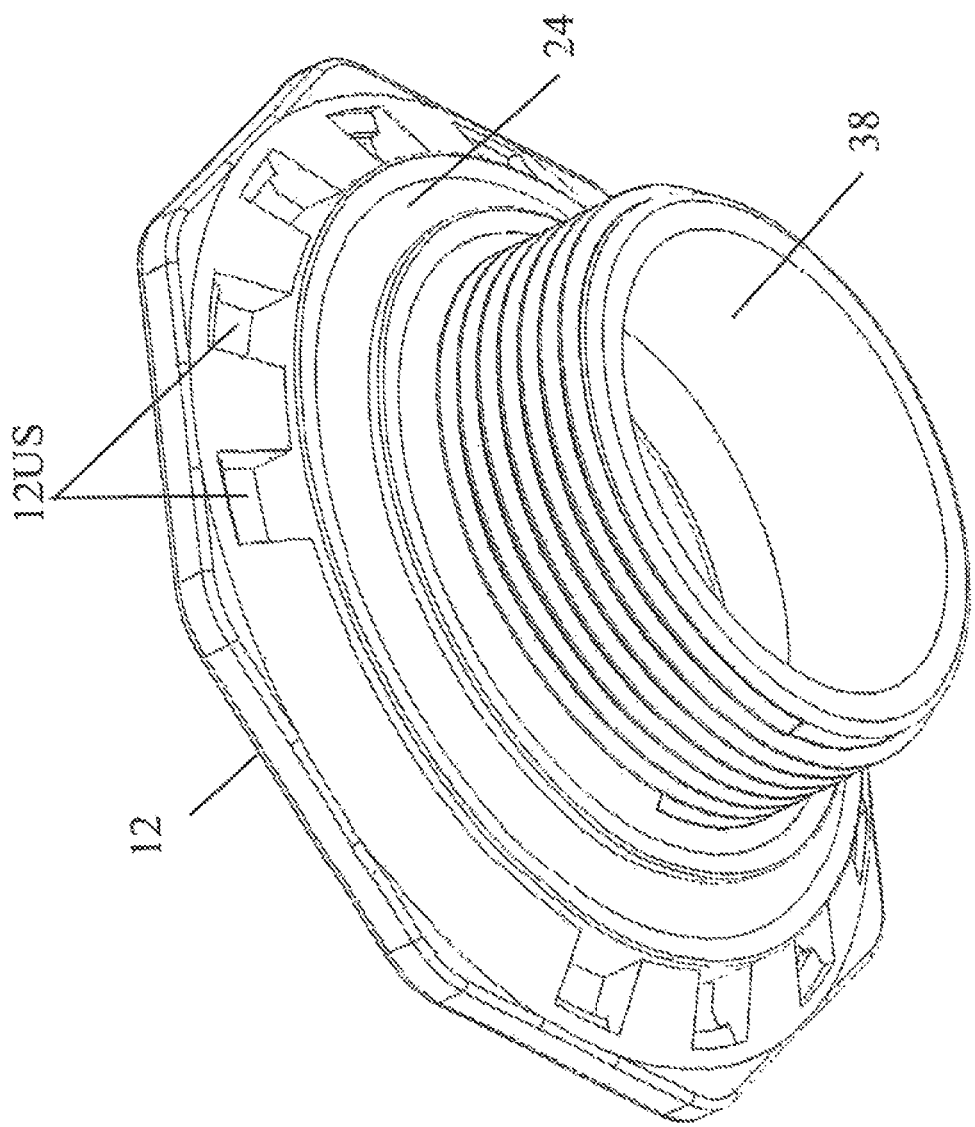
FIG. 12 is a perspective bottom view of the upper body of the relief valve of the invention.

The present invention is an improvement of U.S. Pat. Nos. 7,469,713 and 7,096,884, the disclosures of which are each hereby incorporated by reference herein. Similar to these earlier embodiments in these patents and using similar reference numerals where appropriate as shown in FIGS. 1-4, the relief valve 10 of the invention comprises an upper body 12U and a lower body (not shown) threadably coupled together by complementary respective threads (see FIG. 12). A cap 14 is coupled to the upper body 12U. Cap 14 comprises a plurality of flow openings 16 about its periphery allowing internal fluid such as air to flow through the relief valve 10 to then be exhausted therefrom via openings 16 as shown by arrows 18.

The upper body 12U and the lower body may be connected about an opening in an inflatable through the use of a complementary flanges 24 that sealingly capture the edge of the opening in the inflatable as the bodies are tightly threaded together. Alternatively, the lower body may comprise a heat-sealable flange that is sealed about the edge of the opening in the inflatable. Representative heat-sealable flanges are disclosed in U.S. Pat. Nos. 2,219,190, 4,015,622, 4,927,397 and 6,009,895, the disclosures of each of which are hereby incorporated by reference herein.

Figure 11:
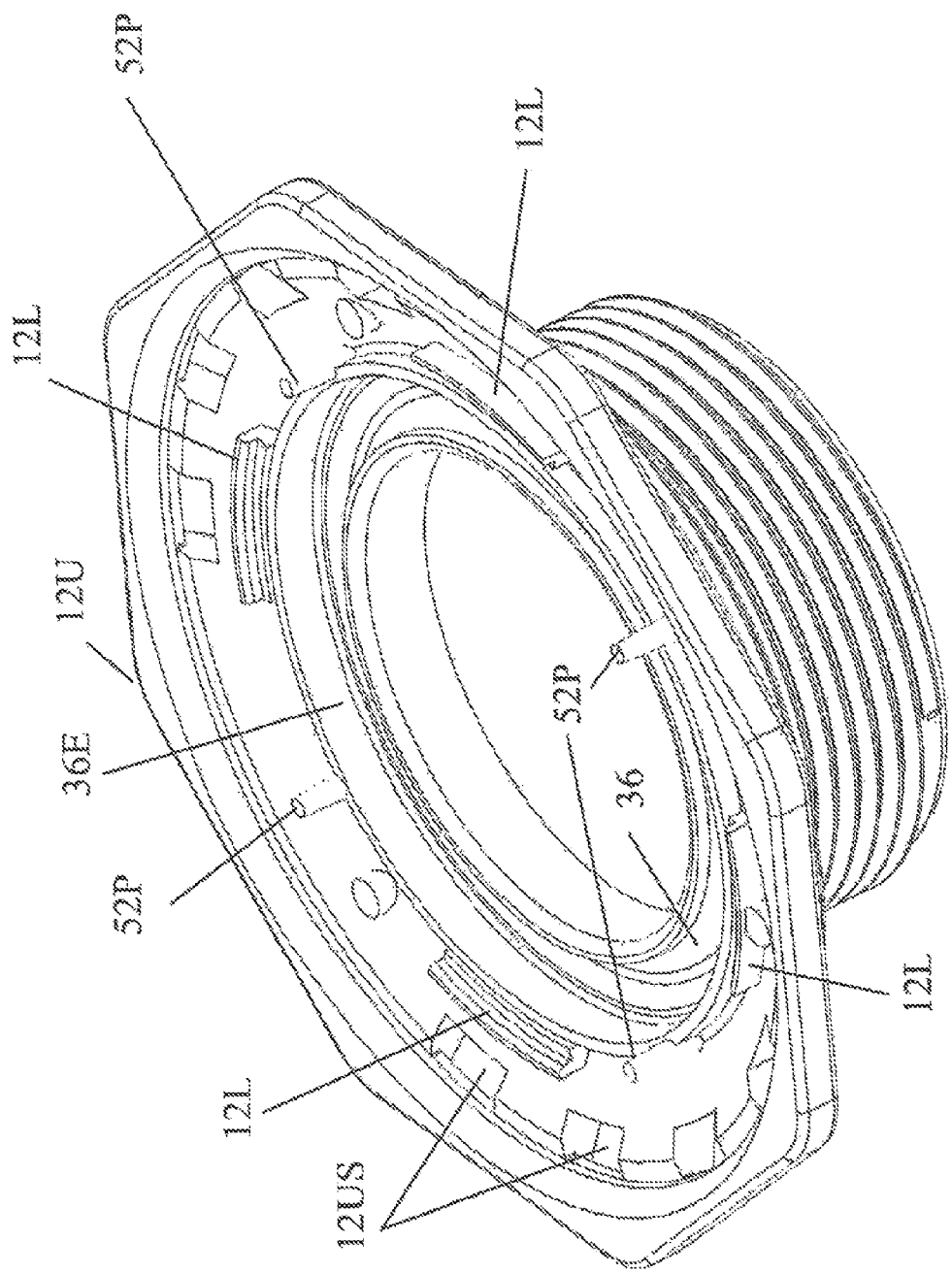
FIG. 11 is a perspective top view of the upper body of the relief valve of the invention.

The relief valve 10 of the invention comprises a poppet 30 having an annular groove 32 in which is positioned an annular O-ring 34 that seats on an annular seat 36 formed at the end of the lumen 38 of the upper body 12U (see FIG. 11). The poppet 30 is retained within the body 12U by an exhaust ring 40 that centers the poppet 30 yet allows it to reciprocate upwardly and downwardly during opening and closing of the valve 10.

Figure 9:
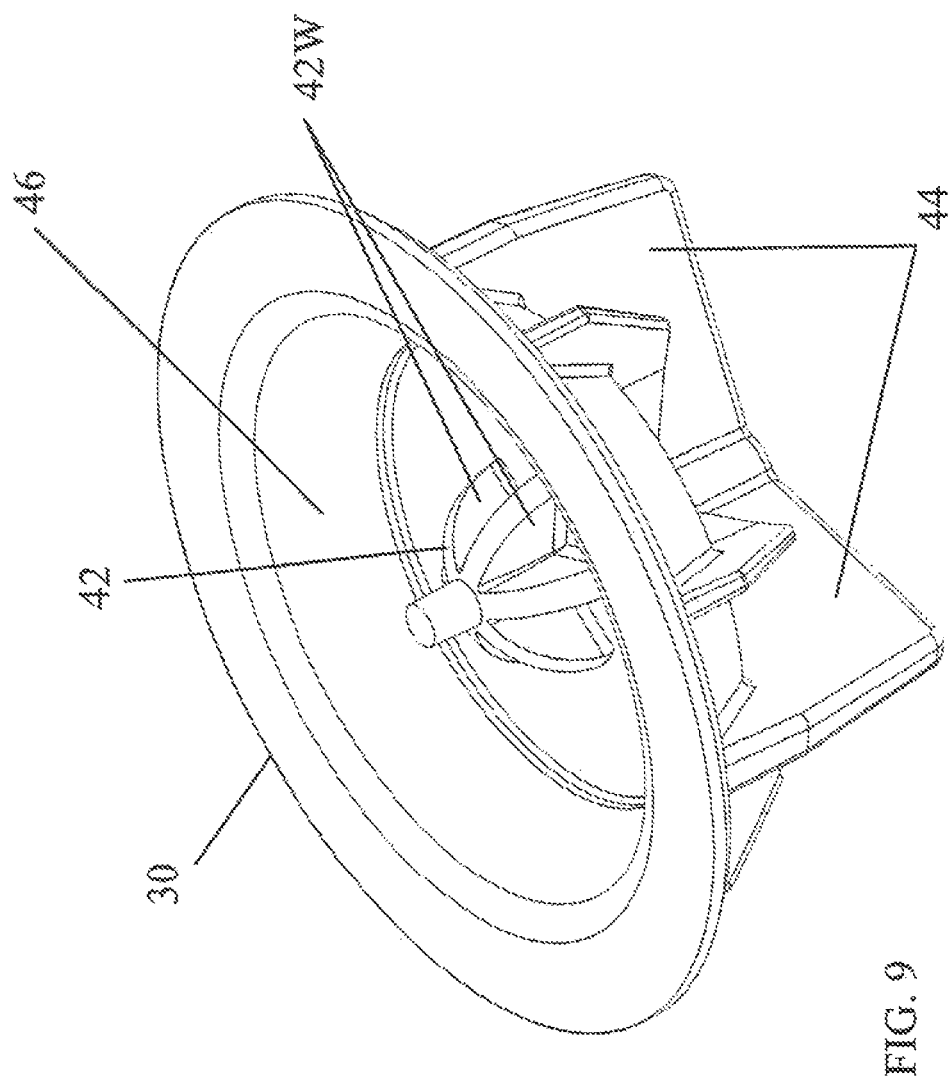
FIG. 9 is a perspective top view of the poppet of the relief valve of the invention.
Figure 10:
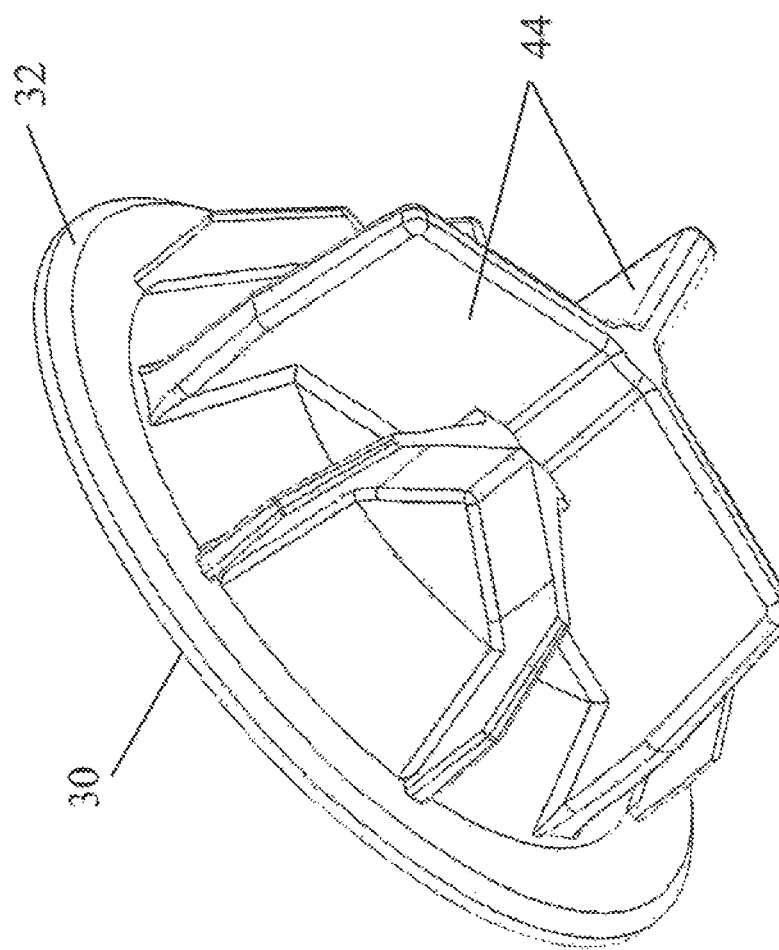
FIG. 10 is a perspective bottom view of the poppet of the relief valve of the invention.

As best shown in FIGS. 9 and 10, the poppet 30 includes a generally concave portion 46 having an upstanding protrusion 42 extending from the inside center thereof. Protrusion 42 comprises a plurality of interior webs 42W positioned at uniform intervals and forming a semi-spherical outer configuration. Poppet 30 further comprises three exterior webs 44 positioned at 120 degree intervals and being slightly tapered inwardly from the lumen 38 of the body 12.

Figure 1:
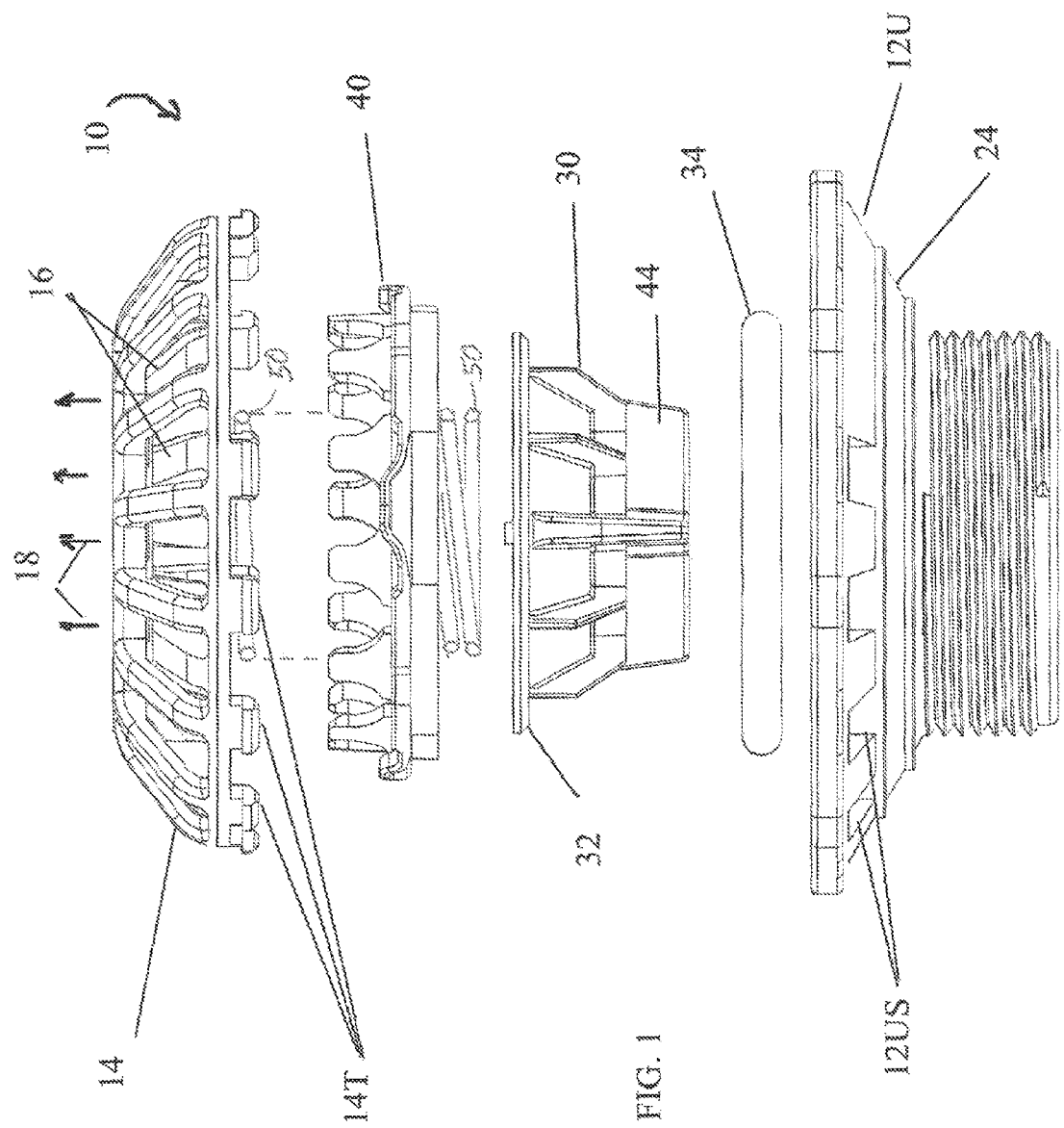
FIG. 1 is a front view of the relief valve of the invention.
Figure 3:
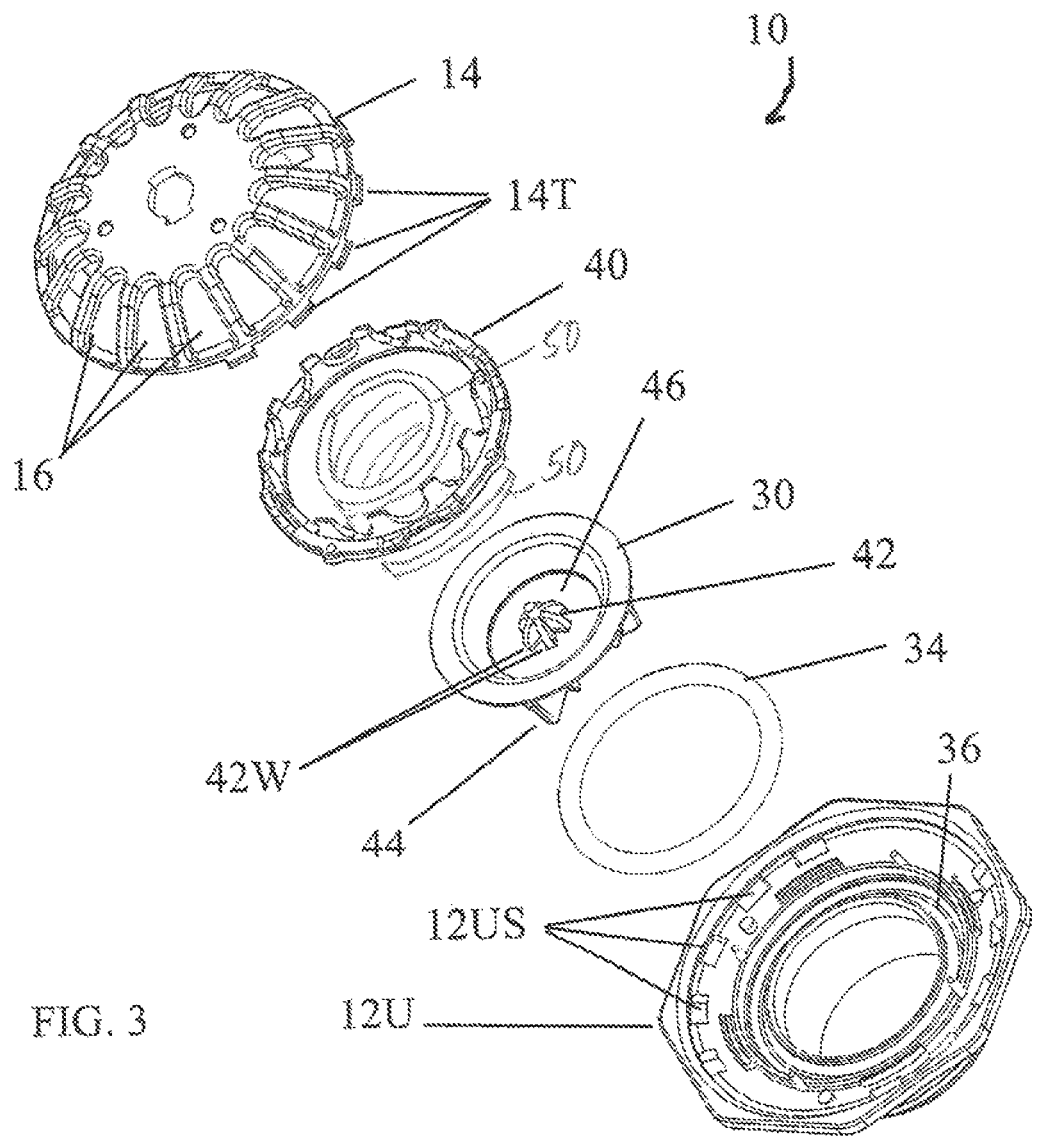
FIG. 3 is a an exploded perspective top view of the relief valve of the invention (with spring omitted)
Figure 4:
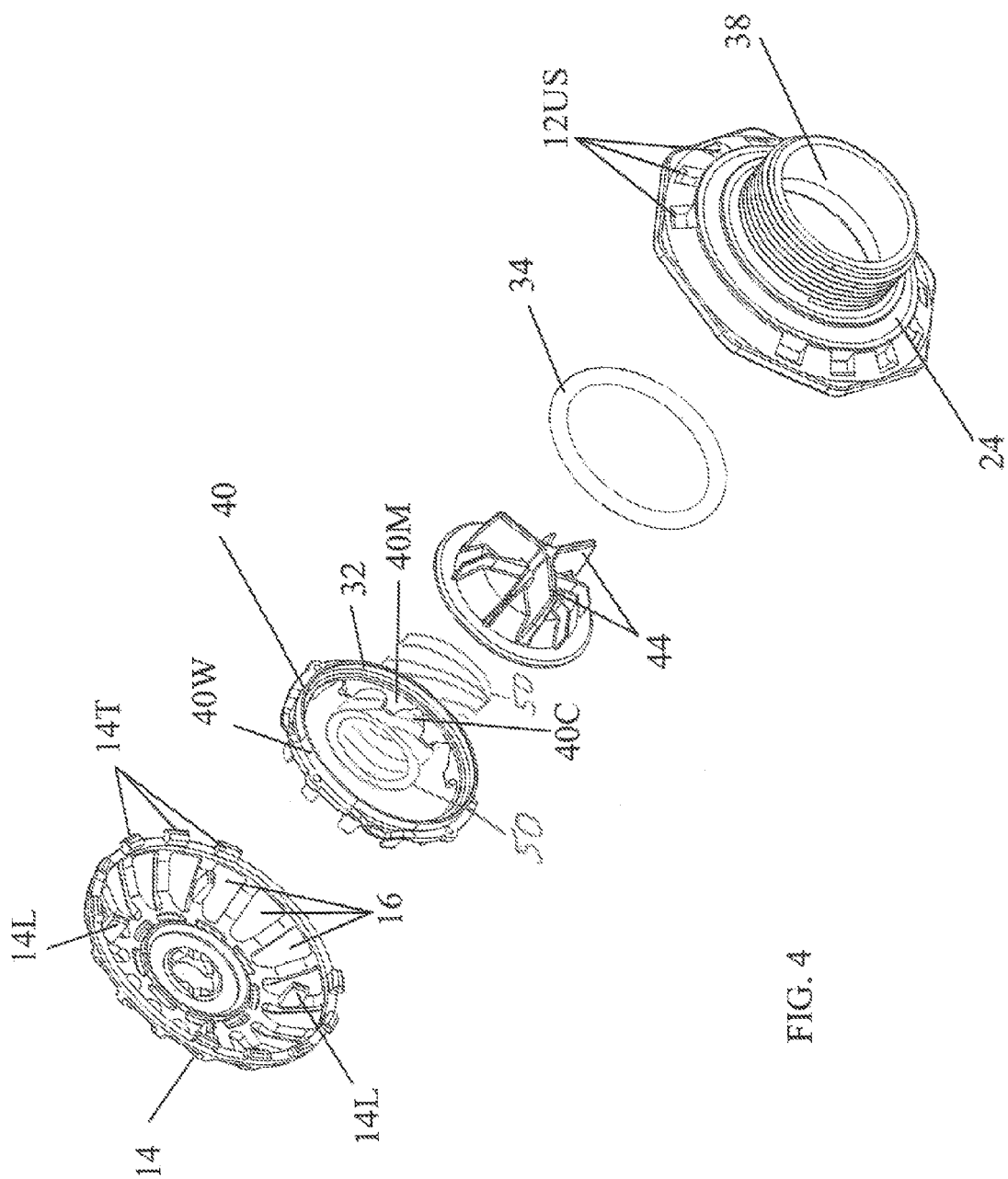
FIG. 4 is an exploded perspective bottom view of the relief valve of the invention (with spring omitted)
Figure 5:
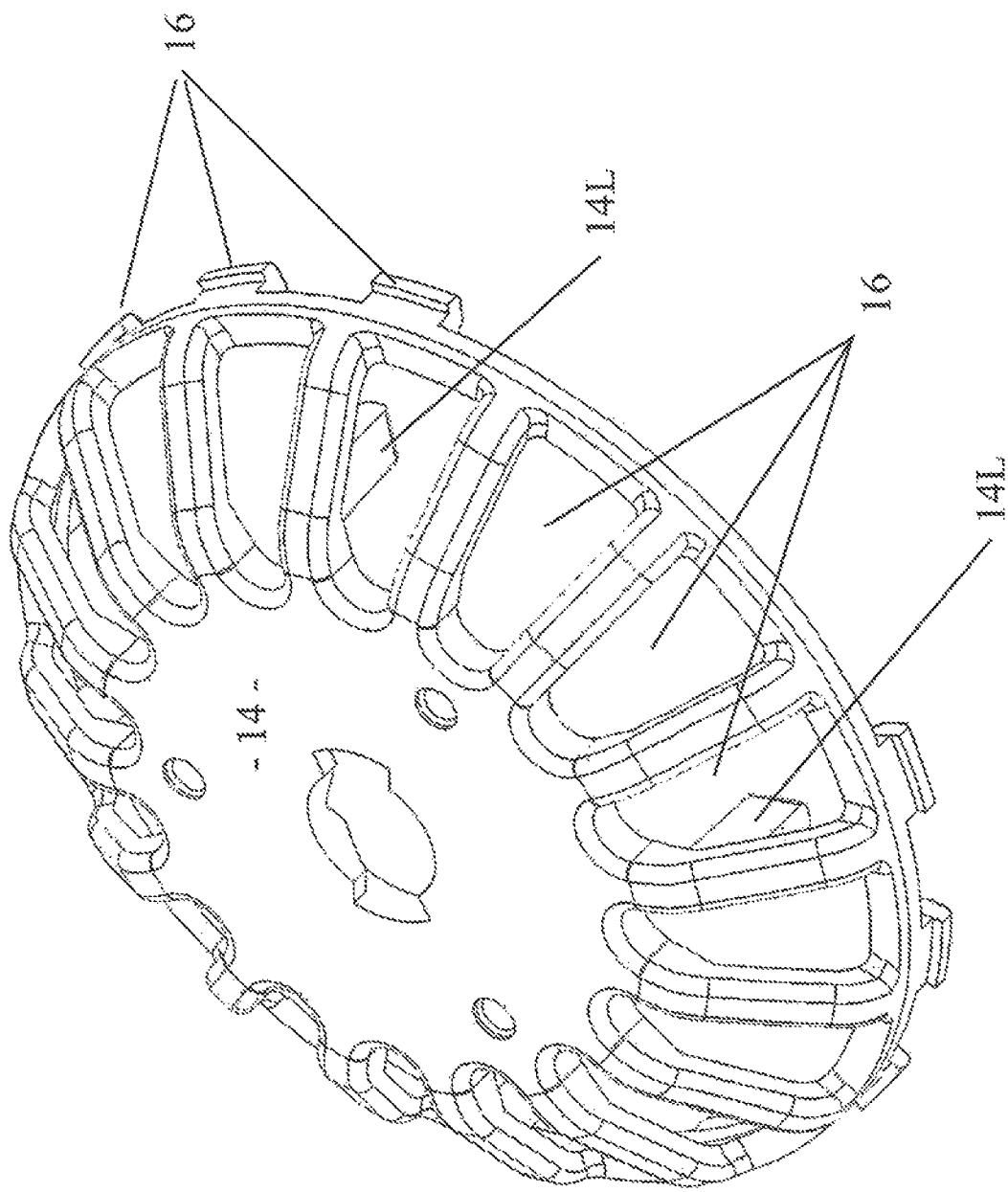
FIG. 5 is a perspective top view of the cap of the relief valve of the invention.
Figure 6:
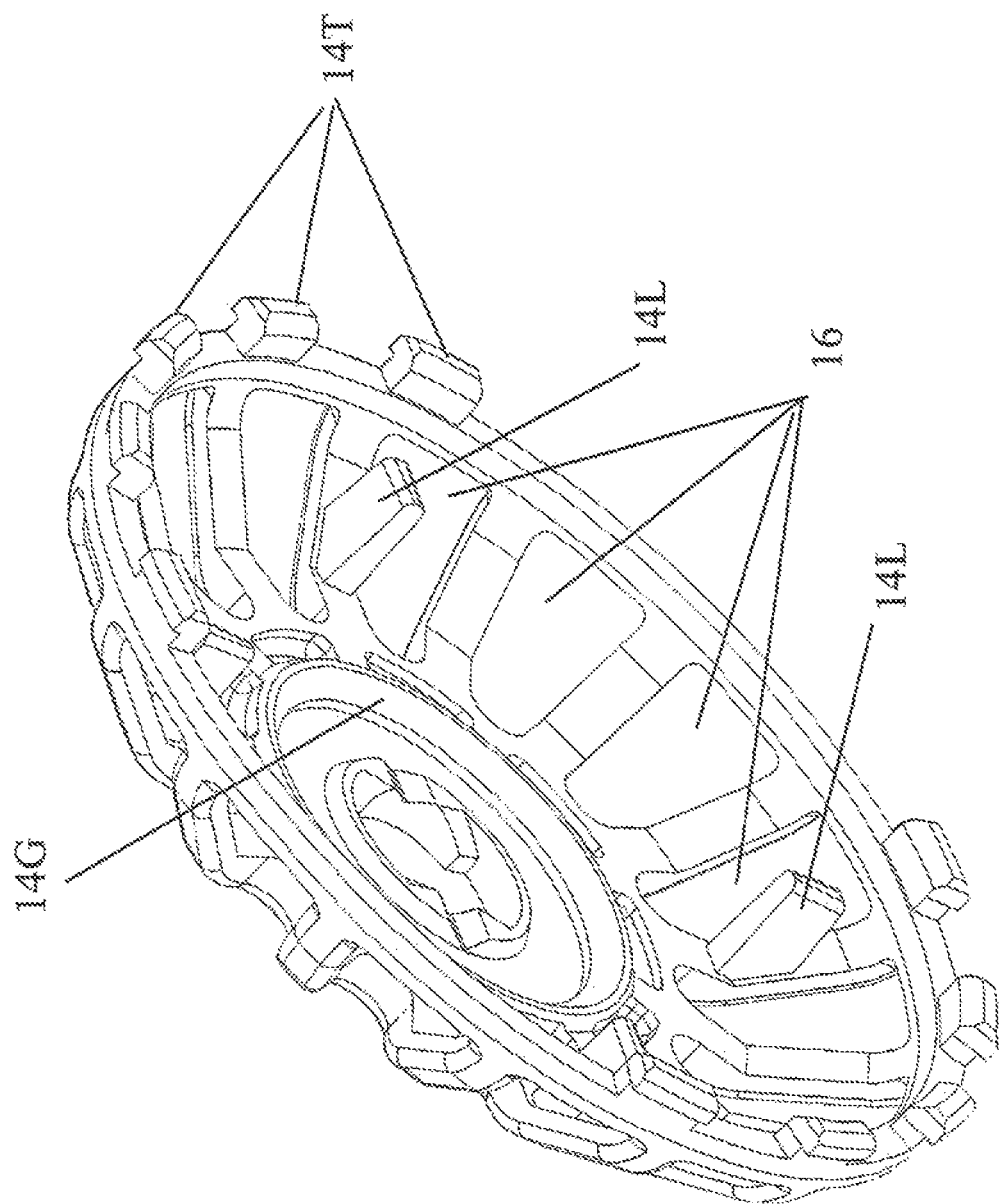
FIG. 6 is a perspective bottom view of the cap of the relief valve of the invention.

As best shown in FIGS. 5 and 6, cap 14 comprises a plurality of tabs 14T that snap into corresponding slots 12US formed in the outer periphery of the cap 14 to securely retain the cap 14 into position. Cap 14 further comprises a plurality of downwardly extending legs 14L, such as three positioned at 120 degree intervals, to secure the exhaust ring 40 into position when the cap 14 is affixed to the upper body 12U. The exhaust ring 40 coupled with the exterior webs 44 assure that the poppet 30 may reciprocate upwardly within cap 14 without tilting sideways out of alignment where it might otherwise potentially jam.

Figure 13:
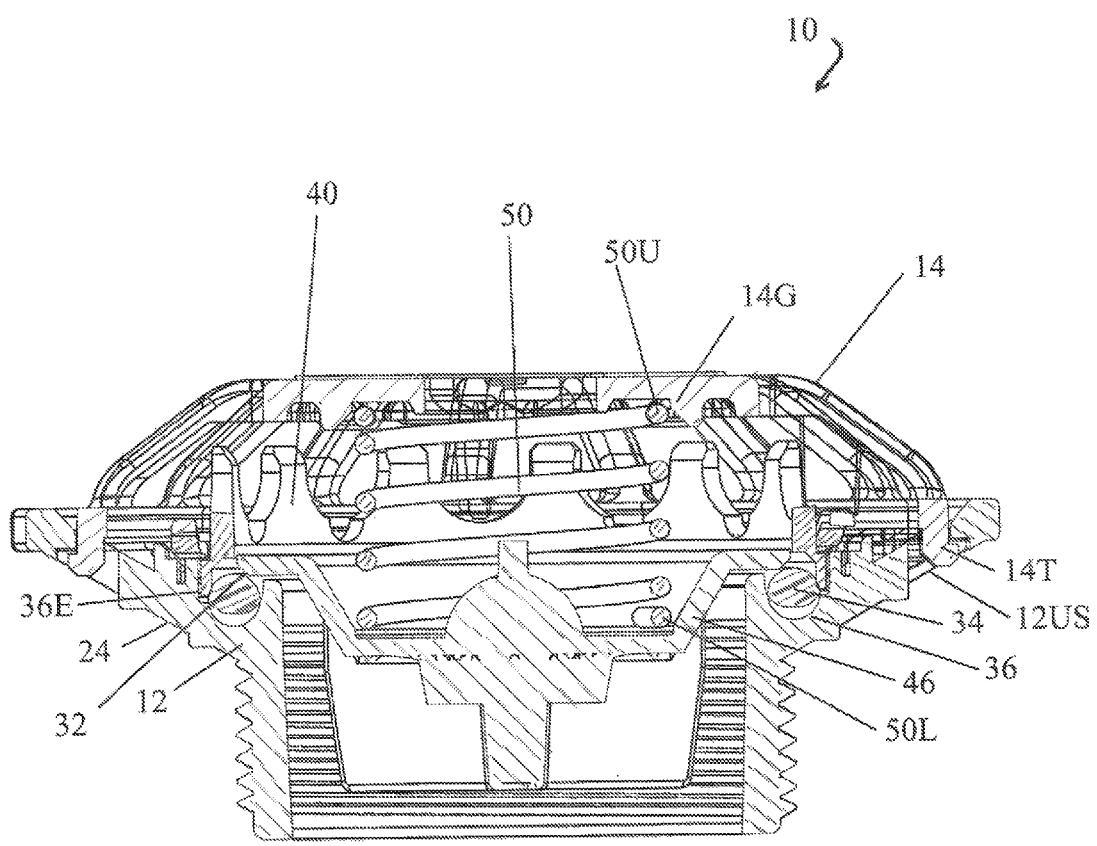
FIG. 13 is a cross-sectional view of the relief valve of the invention showing the cylindrical spring installed.

As shown in FIG. 13, the relief valve 10 of the invention further comprises a cylindrical spring 50 having its uppermost coil 50U captured by an annular groove 14G formed in the underside of the cap 14. The lowermost coil 50L is dimensioned to fit into and be captured within the periphery of the concave portion 46 of the poppet 30.

Figure 7:
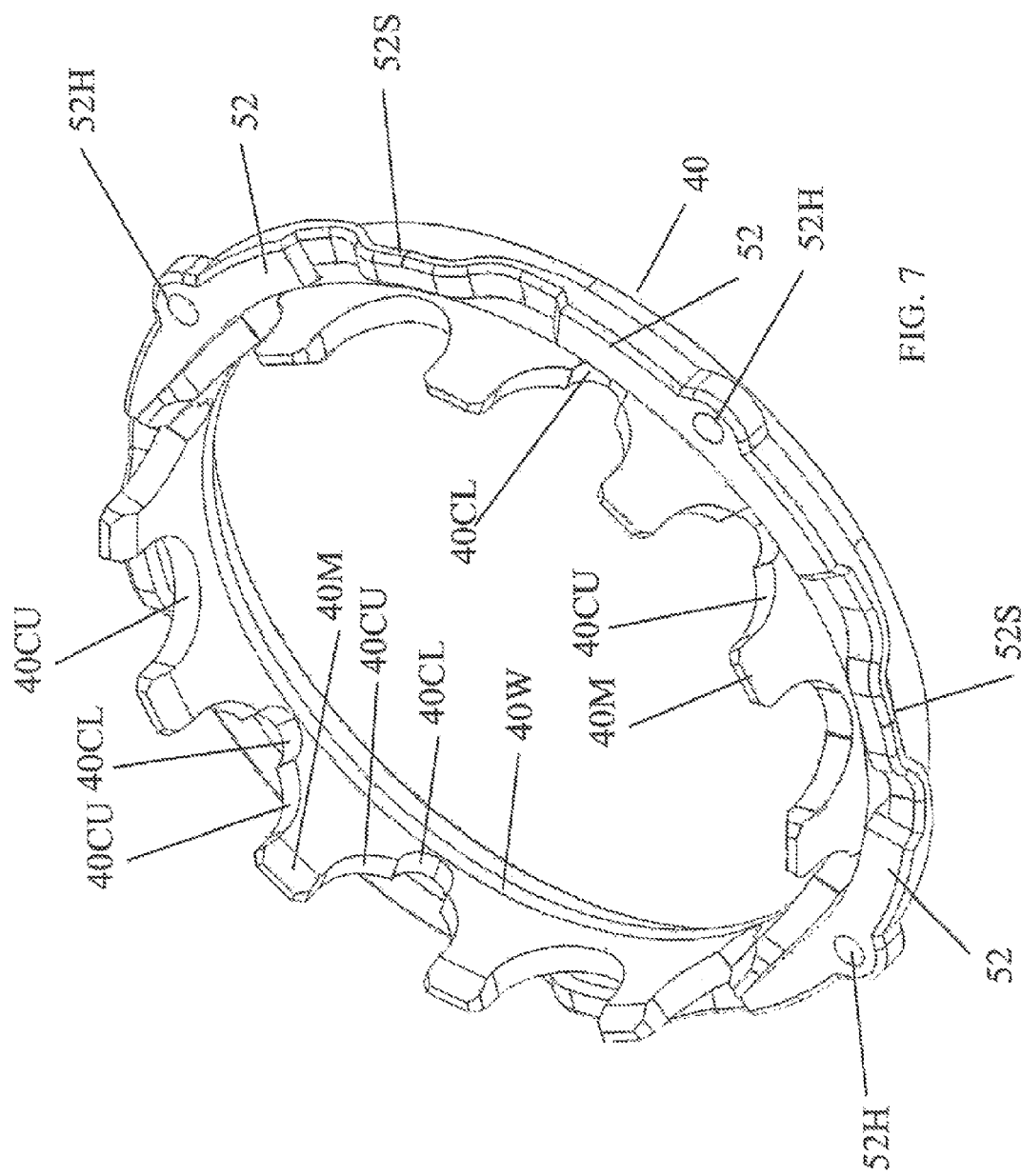
FIG. 7 is a perspective top view of the exhaust ring of the relief valve of the invention.
Figure 8:
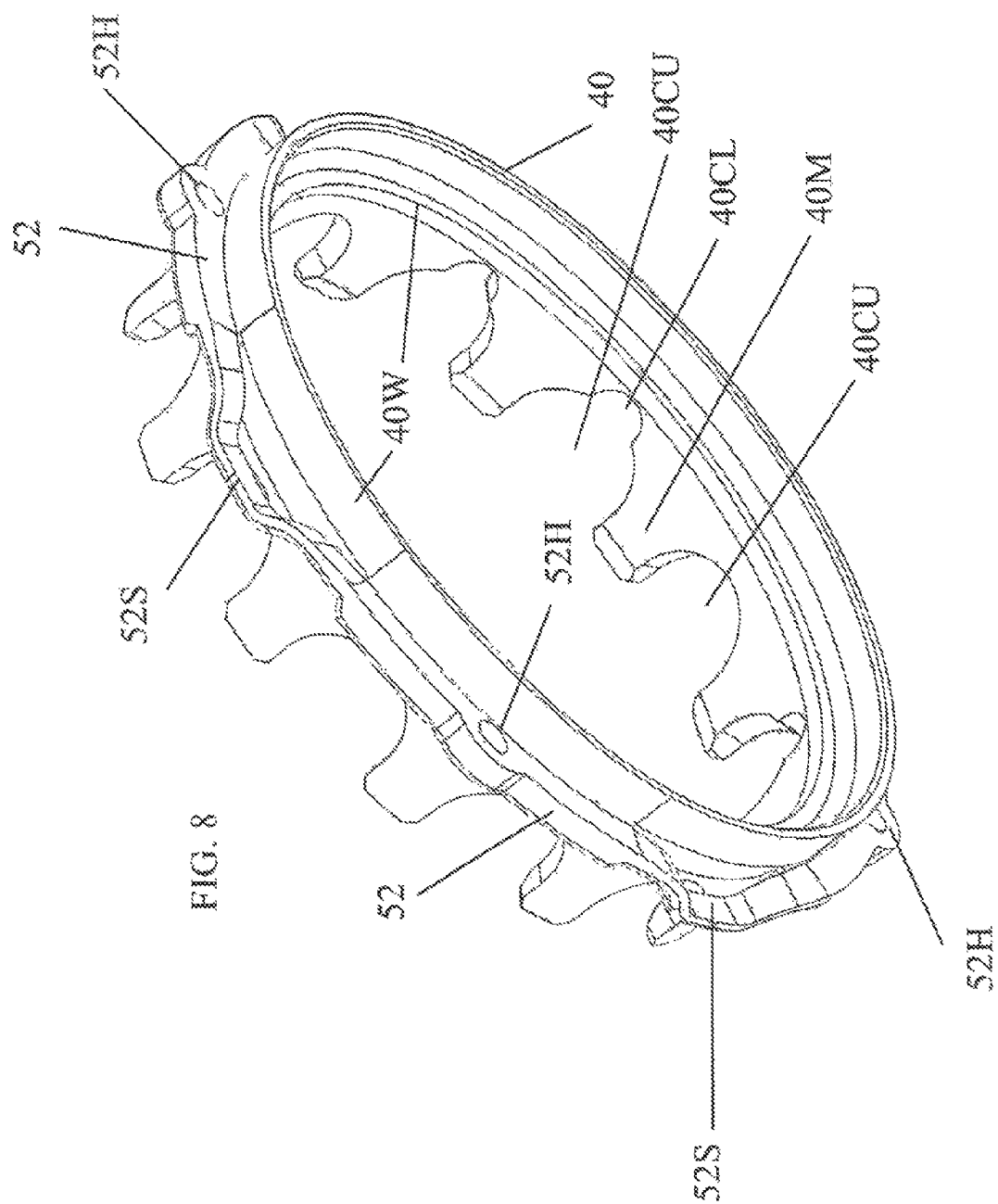
FIG. 8 is a perspective bottom view of the exhaust ring of the relief valve of the invention.

The exhaust ring 40 of the relief valve 10 of the present invention is best shown in FIGS. 7 and 8. As noted above, the exhaust ring 40 functions to center the poppet 30 about the annular seat 36 of the upper body 12U for proper sealing when the valve is closed and to guide the poppet 30 to rise straight upwardly during opening and to lower straight downwardly during closing to be once again properly re-seated in sealing engagement onto O-ring 34 positioned in the annular seat 36. Moreover, the exhaust ring 40 defines the rate of exhausting fluid flow about the periphery of the poppet 30 as the poppet raises and lowers during opening and closing and to achieve a re-seating pressure that is substantially equal to or slightly less than the cracking pressure while minimizing possible oscillations during re-seating of the poppet.

More particularly, the exhaust ring 40 comprises an annular circular wall 40W that is slightly larger in diameter than the outer peripheral diameter of the poppet 30 to allow it to reciprocate upwardly and downwardly therein. The upper edge of the annular wall 40W is crenelated, with a series of alternating crenels 40C and merlons 40M which together define an increasing cross-sectional exhaust area circumferentially about the poppet 30 during cracking (i.e., once the pressure in the inflatable device exceeds the cracking pressure) as the poppet 30 rises in exhaust ring 40 in response to increased pressures and, conversely, a decreasing cross-sectional exhaust area about the poppet 30 during closing as the poppet 30 lowers to its re-seated, sealed position.

A collar 52 is integrally formed about the wall 40W of the exhaust ring 40 that is seated to onto an upper outer edge 36E of the annular seat 36 during assembly. The collar 52 comprises a plurality of mounting holes 52H that are operatively positioned to fit over a corresponding plurality of mounting posts 52P extending upwardly from the periphery of the upper outer edge 36E of the annular seat 36. Arcuate ledges 12L (e.g., four) extend upwardly about the periphery of the upper outer edge 36E to further centrally locate the collar 40C.

The collar 52 further includes a plurality of resilient spring portions 52S that are aligned with the respective depending legs 14L extending from the underside of the cap 14. The resilient spring portions 52S when engaged by the legs 14L assure that the collar 40C of the exhaust ring 40 will remain tightly seated onto the upper outer edge 36E within allowable manufacturing tolerances.

It has been advantageously discovered that oscillations are minimized during opening or closing of the poppet 30 when at least some of the crenels 40C comprise a stepped design, the lower stepped portion 40CL having a lower radius than an upper stepped portion 40CU. Experimentation has revealed that this stepped design of the crenels 40C produces an initial lower rate of exhausting as the poppet 30 rises slightly from its seated position on the O-ring 34 to an elevation proximate to the lower stepped portion 40CL exhaust ring 40. Then, the rate of exhausting step-increases as the poppet 30 further rises to an elevation proximate to the upper stepped portion 40CU. Conversely, this stepped design of the crenels 40C produces a stepped decrease in the rate of exhausting as the poppet 30 lowers and transitions through the intersection of the upper and lower stepped portions 40CU and 40CL. The stepped increase/decrease in the rate of exhausting is believed to minimize possible noisy oscillations in the opening and closing of the poppet 30 because the poppet 30 opens and closes more pronouncedly than would otherwise occur without a stepped design.

Similar to its earlier embodiment shown in U.S. Pat. No. 7,096,884, the relief valve of the invention may optionally incorporate a locking key (not shown) for fixedly locking the poppet 30 in its sealed, closed position seated on the annular seat 36 to thereby prevent the poppet 30 from cracking open irrespective of the internal pressure that would otherwise crack the poppet 30 against the force of the spring 50.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A relief valve, comprising in combination:
   an upper body having an annular seat formed at an end of a lumen;
   a poppet having an annular groove in which is positioned an annular 0-ring that seats on said annular seat;
   an exhaust ring for retaining said poppet within said body, said exhaust ring further centering said poppet allowing said poppet to reciprocate during opening and closing of the relief valve;
   a cap affixed to said upper body for securing said exhaust ring into position;
   a spring having an uppermost coil captured in an underside of said cap and a lowermost coil captured within a periphery of said poppet; and
   a plurality of arcuate ledges extending about said periphery of said upper outer edge to further centrally locate said collar.

2. The relief valve as set forth in claim 1, wherein said collar further includes a plurality of resilient spring portions that are aligned with respective depending legs extending from said an underside of the cap to assure that said collar of said exhaust ring remains tightly seated onto said upper outer edge.

3. The relief valve as set forth in claim 1, wherein said poppet comprises a generally concave portion having an upstanding protrusion extending from the inside center thereof, said protrusion comprising a plurality of interior webs forming a semi-spherical outer configuration and a plurality of exterior webs slightly tapered inwardly from a said lumen of said upper body.

4. The relief valve as set forth in claim 3, wherein said cap comprises a plurality of tabs that snap into corresponding slots formed in an outer periphery of said upper body to securely retain said cap into position, said cap further comprising a plurality of extending legs to secure said exhaust ring into position when said cap is affixed to said upper body.

5. The relief valve as set forth in claim 4, wherein said exhaust ring coupled with said exterior webs assure that said poppet may reciprocate upwardly within said cap without tilting sideways out of alignment.

6. The relief valve as set forth in claim 1, wherein at least one of said crenels comprise a stepped design.

7. The relief valve as set forth in claim 6, wherein said stepped design of said crenels comprises a lower stepped portion and an upper stepped portion.

8. The relief valve as set forth in claim 7, wherein said lower stepped portion includes a lower radius than said upper stepped portion.

9. The relief valve as set forth in claim 1, wherein said exhaust ring defines a rate of an exhausting fluid flow about a periphery of said poppet as said poppet reciprocates during opening and closing and to achieve a re-seating pressure that is substantially equal to or slightly less than a cracking pressure of said poppet.

10. The relief valve as set forth in claim 9, wherein said exhaust ring comprises an annular circular wall that is slightly larger in diameter than an outer peripheral diameter of said poppet to allow said poppet to reciprocate therein.

11. The relief valve as set forth in claim 10, wherein an upper edge of said annular wall comprises crenellations having a series of alternating crenels and merlons which together define an increasing cross-sectional exhaust area circumferentially about said poppet as said poppet rises in said exhaust ring and a decreasing cross-sectional exhaust area circumferentially about said poppet as said poppet lowers in said exhaust ring.

12. The relief valve as set forth in claim 11, further including a collar integrally formed about said annular wall of said exhaust ring that is seated onto an upper outer edge of said annular seat.

13. The relief valve as set forth in claim 12, wherein said collar comprises a plurality of mounting holes that are operatively positioned to fit over a corresponding plurality of mounting posts extending upwardly from a periphery of an upper outer edge of said annular seat.

* * * * *